United States Patent
Wada et al.

(10) Patent No.: US 7,472,408 B2
(45) Date of Patent: Dec. 30, 2008

(54) DISK APPARATUS

(75) Inventors: Shinichi Wada, Ehime (JP); Kengo Masaoka, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/576,141

(22) PCT Filed: Oct. 14, 2004

(86) PCT No.: PCT/JP2004/015547

§ 371 (c)(1),
(2), (4) Date: Feb. 12, 2007

(87) PCT Pub. No.: WO2005/038794

PCT Pub. Date: Apr. 28, 2005

(65) Prior Publication Data

US 2007/0174855 A1 Jul. 26, 2007

(30) Foreign Application Priority Data

Oct. 20, 2003 (JP) .................... 2003-359035

(51) Int. Cl.
*G11B 17/028* (2006.01)
(52) U.S. Cl. .................................... 720/714
(58) Field of Classification Search ........... 720/714, 720/604, 690, 706, 709, 713; 369/270; 360/99.02, 360/99.06, 99.09
See application file for complete search history.

(56) References Cited

U.S. PATENT DOCUMENTS

| | | | | |
|---|---|---|---|---|
| 4,736,358 A | * | 4/1988 | Hoshi et al. | 720/713 |
| 5,058,094 A | * | 10/1991 | Suzuki | 720/706 |
| 6,941,570 B2 | * | 9/2005 | Kim | 720/709 |
| 6,959,445 B2 | * | 10/2005 | Mizuno | 720/690 |
| 2002/0044522 A1 | | 4/2002 | Inata | |
| 2003/0053401 A1 | * | 3/2003 | Ogasawara et al. | 369/270 |
| 2003/0147337 A1 | * | 8/2003 | Kim | 369/270 |
| 2007/0050787 A1 | * | 3/2007 | Ryu | 720/604 |

FOREIGN PATENT DOCUMENTS

| | | |
|---|---|---|
| CN | 1347111 | 5/2002 |
| JP | 4-58834 | 5/1992 |
| JP | 2002-352497 | 12/2002 |
| JP | 2002-352498 | 12/2002 |

OTHER PUBLICATIONS

Chinese Office Action dated Jul. 20, 2007 with English translation thereof.

* cited by examiner

*Primary Examiner*—Tianjie Chen
(74) *Attorney, Agent, or Firm*—Dickinson Wright, PLLC

(57) ABSTRACT

A disk apparatus moves a traverse unit vertically, a spindle motor is allowed to approach a base body or a lid, a disk is pressed by the spindle motor and the lid, thereby mounting the disk on the spindle motor. When the spindle motor is moved upward, a tip end surface of a convex portion of the lid is inclined, the tip end surface of the convex portion of the lid and the spindle motor are substantially in parallel to each other, and the disk can stably be mounted.

4 Claims, 3 Drawing Sheets

DISK APPARATUS

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

As a slot-in type disk conveying method, there are a roller method and an arm method. In order to provide a constant clearance with respect to a traverse (spindle motor) when a disk is conveyed, a traverse unit is vertically moved in both methods. For vertically moving the traverse unit, there are a vertically parallel moving method and a so-called one-side inclining moving method. In the latter method, only one side is rotated and vertically moved around a rotation center shaft provided on the side of a disk insertion opening. The traverse unit is fixed, and a clamper is vertically moved in some cases. In such a mechanism, as a method for mounting a disk on a rotation stage of a spindle motor, there are a clamper method, a pawl chuck method and a ball chuck method. In recent years, it is required to reduce a disk apparatus in size and thickness in line with the downsizing trends of personal computers. In order to reduce a slot-in type disk apparatus in thickness, the clamper method has a small space and its structure is difficult. Therefore, there are used the pawl chuck method or the ball chuck method in which a disk is pushed against a convex portion provided on a lid of a disk apparatus, a disk is held by a pawl or a ball provided on a rotation portion of the spindle motor and thus, the disk is mounted (e.g., patent document 1).

[Patent document 1] Japanese Patent Application Laid-open No. 2002-352497 (FIGS. 12 to 14)

In the so-called one-side inclining moving method in which only one side is rotated and vertically moved around the rotation center shaft provided on the side of the disk insertion opening, a traverse unit having a spindle motor is vertically moved, a disk is pushed against a convex portion provided on a lid of a disk apparatus, and the disk is held and mounted by a pawl or a ball provided on a rotating portion of the spindle motor. At that time, a rotation stage of the spindle motor is inclined.

FIG. 6 is a sectional view of an essential portion of a disk apparatus according to the conventional technique for explaining this state. FIG. 7 is a sectional view of an essential portion of a lid of the disk apparatus. FIG. 7 shows a mounting operation state of a disk 14 on a spindle motor 1. After a disk is inserted, a traverse 2 is displaced in a direction in which a spindle motor 1 approaches a lid 400 around a rotation support shaft X on the front side. When the spindle motor 1 is moved in a direction in which the spindle motor 1 most approaches the lid 400, as shown in the drawing, the disk 14 abuts against the lid 400, and the disk 14 is pressed by the spindle motor 1 and the lid 400. A pawl or a ball (not shown) provided on a hub 1a of the spindle motor 1 is fitted into a center hole of the disk 14 by this pressing force, and the disk 14 is mounted on the hub 1a and the rotation stage 1b.

However, a convex portion 401 provided on the lid 400 projects in parallel with the lid 400, and the spindle motor 1 is displaced in the direction in which the spindle motor 1 most approaches the lid 400 around the rotation support shaft X on the front side. Therefore, when the traverse 2 most approaches the lid 400, as shown in the drawing, an upper surface of the rotation stage 1b which receives a disk of the spindle motor 1 is inclined with respect to a tip end surface of the convex portion 401 through an angle A°. Therefore, only a portion of a tip end of the convex portion 401 abuts against the disk, a gap B is formed on the other portion, the disk 14 can not be pressed uniformly, a disk is not reliably fitted to the hub 1a and the rotation stage 1b, and a so-called clamp miss occurs.

Hence, it is an object of the present invention to provide a thin disk apparatus capable of reliably mounting a disk on a rotation stage of a spindle motor.

DISCLOSURE OF THE INVENTION

A first aspect of the invention provides a disk apparatus comprising a chassis outer sheath having a base body and a lid, in which a front surface of said chassis outer sheath is formed with a disk inserting opening into which a disk is directly inserted, the base body is provided with a traverse, a spindle motor having a rotation stage on which the disk is placed is held by the traverse, one side of the traverse is inclined and moved by vertically moving means, thereby bringing the rotation stage close to the lid, the disk placed on the rotation stage is pushed toward the rotation stage to mount the disk on the rotation stage by the convex portion provided on the side of the lid such that the convex portion projects toward the rotation stage at a position opposed to the rotation stage, wherein a tip end of the convex portion is inclined such that the tip end of the convex portion becomes substantially in parallel to a surface of the rotation stage when the traverse approaches the lid.

With the aspect, the disk and the tip end surface of the convex portion becomes substantially in parallel to each other, a pressing force of the convex portion is efficiently transmitted to the disk, and the disk can stably be mounted.

According to a second aspect, in the first aspect, the convex portion is integrally formed with the lid by drawing.

With the aspect, the strength of the lid can be enhanced, and the chassis outer sheath can further be reduced in thickness.

According to a third aspect, in the first or second aspect, the tip end of the convex portion on the side of the disk insertion opening is inclined toward the rotation stage.

With the aspect, the disk can smoothly be inserted into and discharged from the insertion opening more reliably.

According to a fourth aspect, in the first or second aspect, a main slider and a sub-slider are provided as the vertically moving means, the main slider is disposed on the side of the spindle motor in such a direction that one end of the main slider comes on the side of a front surface of the chassis outer sheath and the other end comes on the side of a rear surface of the chassis outer sheath, the sub-slider is disposed on the side of the rear surface of the spindle motor in a direction perpendicular to the main slider.

With the aspect, the disk apparatus can be reduced in thickness.

A fifth aspect of the invention provides a disk apparatus in which a convex portion is provided around the opening, a convex portion located on the other end of the traverse is higher than a convex portion located on the one end of the traverse.

With the aspect, a pressing force of the convex portion can be given to the disk also on the rotation supporting side of the traverse, and the disk can stably be mounted.

BEST MODE FOR CARRYING OUT THE INVENTION

Figure 1:
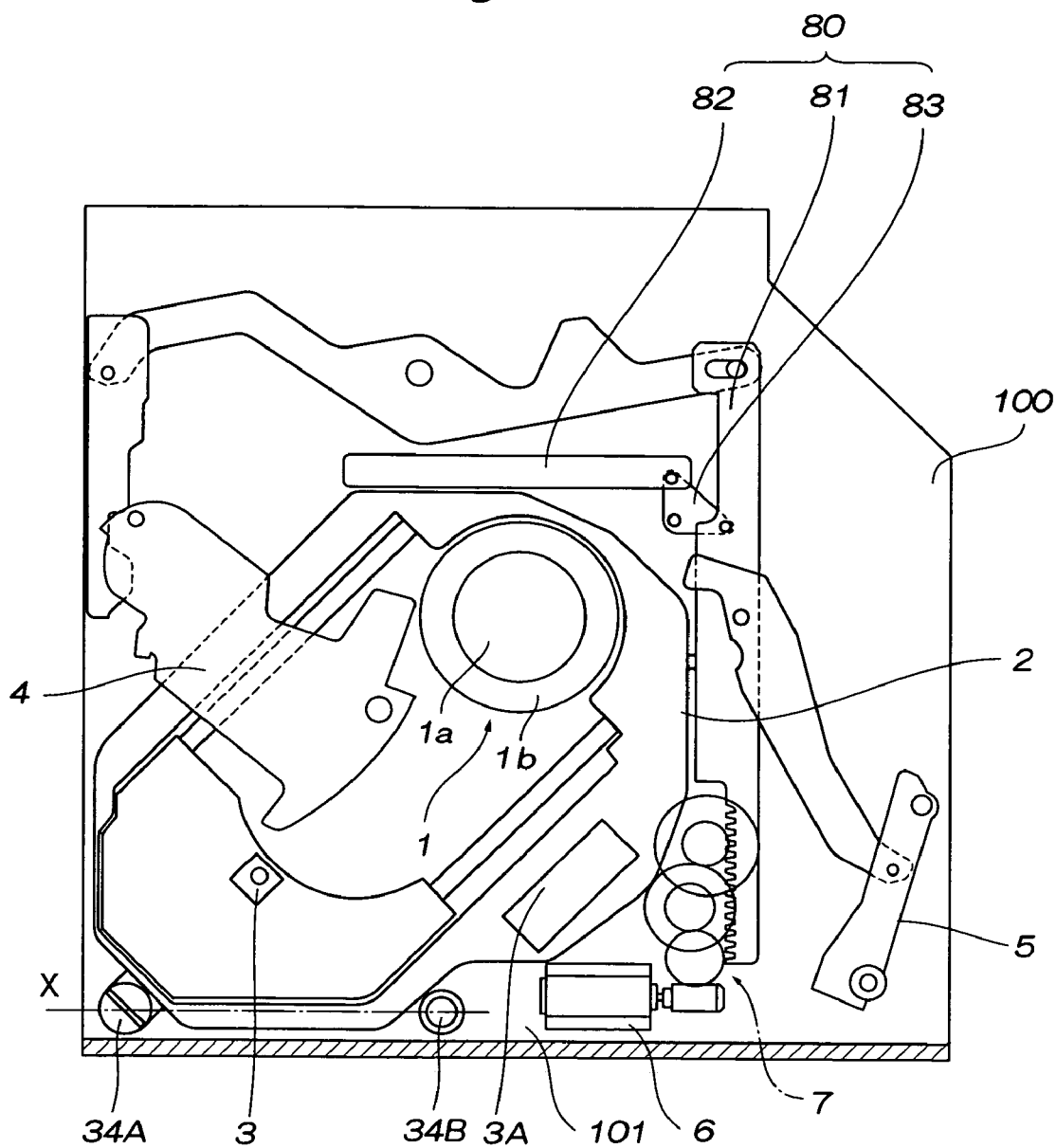
FIG. 1 is a plan view of a base body of a disk apparatus according to an embodiment of the invention.
Figure 2:
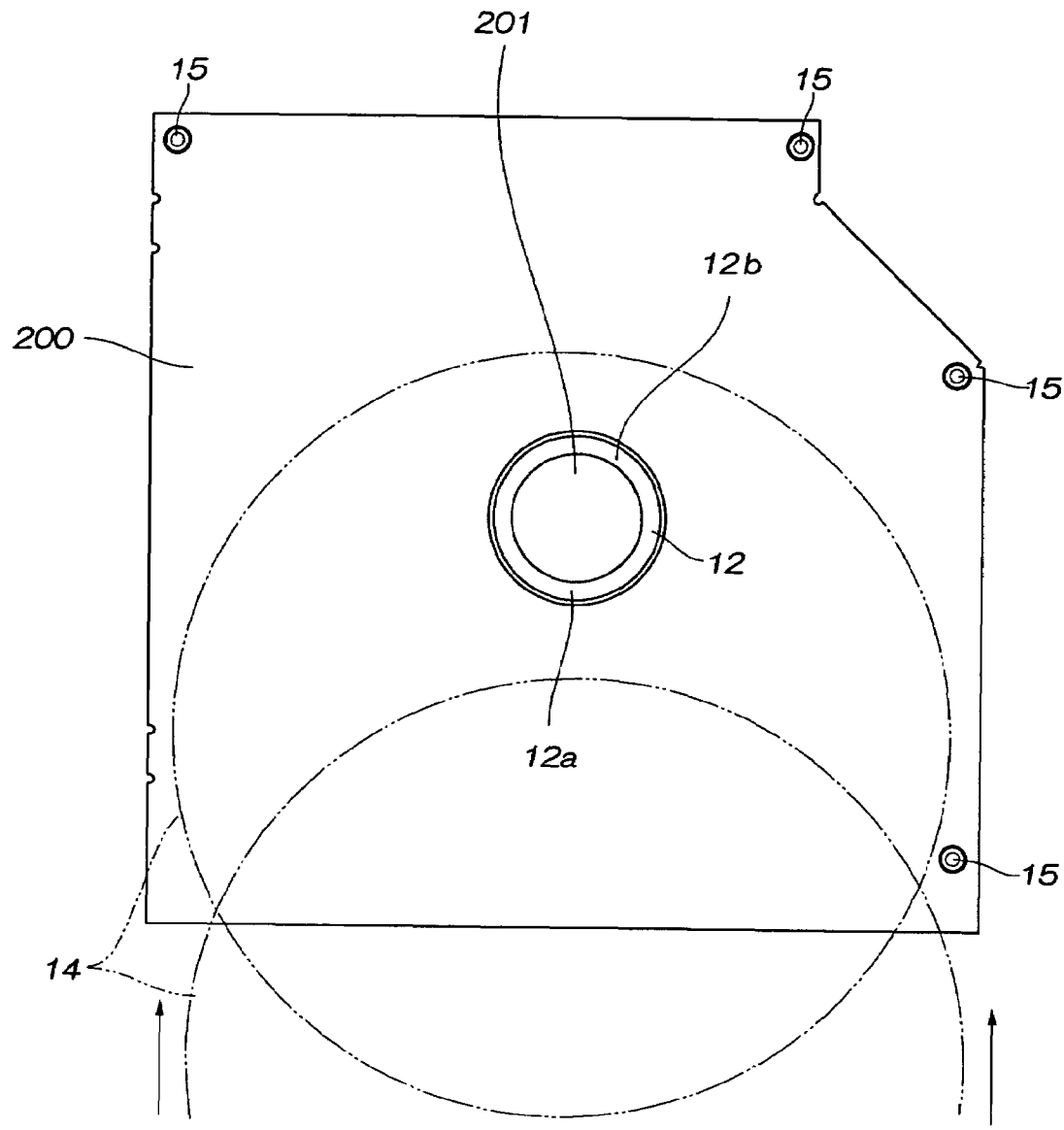
FIG. 2 is a plan view of a lid of the disk apparatus.
Figure 3:
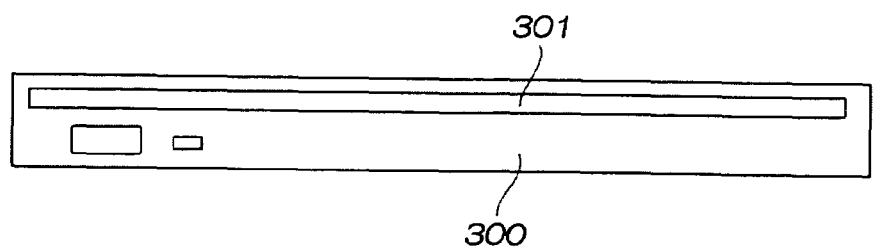
FIG. 3 is a front view of a bezel mounted on a front surface of a chassis outer sheath of the disk apparatus.
Figure 4:
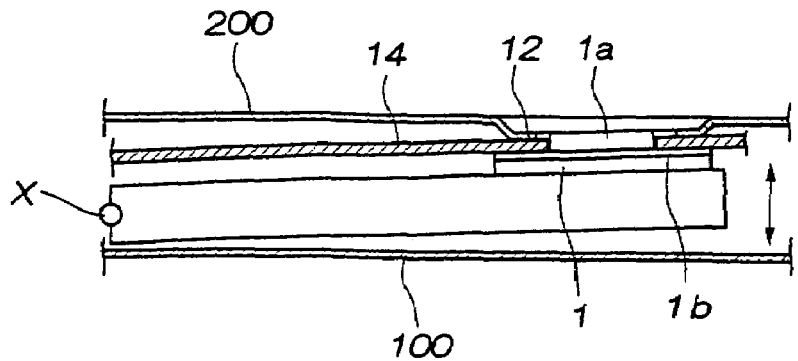
FIG. 4 is a sectional view of an essential portion of the disk apparatus.
Figure 5:
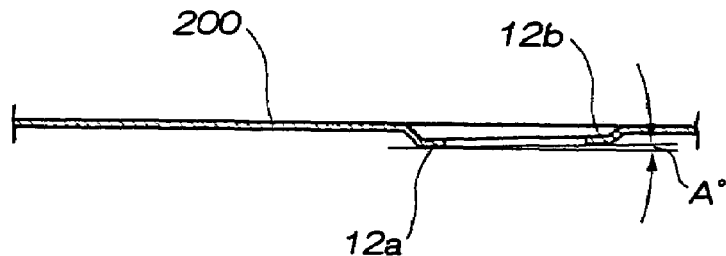
FIG. 5 is a sectional view of an essential portion of a lid of the disk apparatus.
Figure 6:
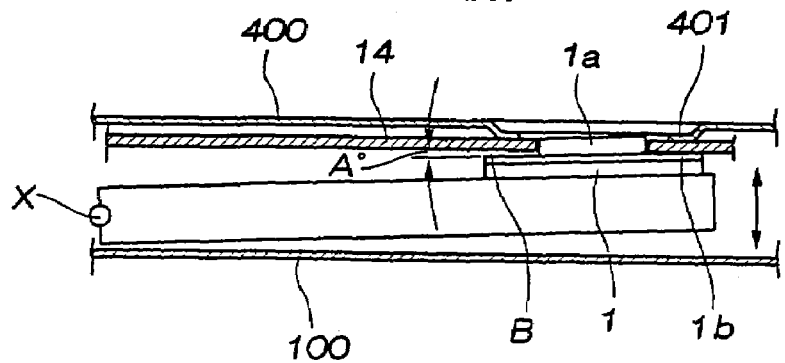
FIG. 6 is a sectional view of an essential portion of a conventional disk apparatus.
Figure 7:
FIG. 7 is a sectional view of an essential portion of a lid of the disk apparatus.

FIG. 1 is a plan view of a base body of a disk apparatus according to an embodiment of the invention. FIG. 2 is a plan view of a lid of the disk apparatus. FIG. 3 is a front view of a bezel mounted on a front surface of a chassis outer sheath of the disk apparatus. FIG. 4 is a sectional view of an essential portion of the disk apparatus. FIG. 5 is a sectional view of an essential portion of a lid of the disk apparatus.

The disk apparatus of the embodiment has a chassis outer sheath comprising a base body 100 and a lid 200. A bezel 300 is mounted on a front surface of the chassis outer sheath. The disk apparatus of the embodiment is of a slot-in type in which a disk is directly inserted from a disk insertion opening 301 provided in the bezel 300 shown in FIG. 3. The base body 100 is formed at its front side with an insertion space 101 corresponding to the disk insertion opening 301 for directly inserting a disk. A traverse 2 is disposed on the side of the disk insertion opening 301 of the base body 100. The traverse 2 holds a spindle motor 1, a pickup 3 and drive means 3A which moves a pickup 3.

The spindle motor 1 is held by the traverse 2. The spindle motor 1 is provided on one end of the traverse 2. The other end of the traverse 2 is turnably supported by a rotation support shaft X by means of a pair of insulators 34A and 34B on the side of the insertion space 101. That is, the traverse 2 operates such as to bring the spindle motor 1 close to and away from the base body 100 around the insulators 34A and 34B.

The spindle motor 1 is provided with a turning stage 1b on which a disk is placed. The turning stage 1b is provided at its center with a hub 1a for chucking a center hole of a disk.

In the traverse 2, the spindle motor 1 is located at a central portion of the base body 100, a reciprocating range of the pickup 3 is located closer to the disk insertion opening 301 than the spindle motor 1, and the reciprocating direction of the pickup 3 is different from the inserting direction of a disk. The reciprocating direction of the pickup 3 and the inserting direction of a disk is in a range of 40° to 45°. The pickup 3 can move from one end to the other end of the traverse 2. When the pickup 3 is stopped, it is disposed on the other end of the traverse 2.

It is preferable that the pair of insulators 34A and 34B are disposed closer to a stationary position of the pickup 3 than the position of the spindle motor 1, and are disposed closer to the disk insertion opening 301 than the stationary position of the pickup 3. In this embodiment, the insulator 34A is provided on the one end of the disk insertion opening 301 close to the inner side, and the insulator 34B is provided on the central portion of the disk insertion opening 301 close to the inner side. The insulators 34A and 34B includes damper mechanisms made of resilient material. The insulators 34A and 34B can be displaced in a direction in which the traverse 2 is separated from the base body 100 by the damper mechanisms.

The vertically moving means 80 for moving the traverse 2 will be explained.

The vertically moving means 80 which displaces the traverse 2 comprises a main slider 81 and a sub-slider 82. The main slider 81 and the sub-slider 82 are disposed sideway of the spindle motor 1. The main slider 81 is disposed in such a direction that one end of the main slider 81 is on the side of a front surface of a chassis main body 100 and the other end of the main slider 81 is on the side of a rear surface of the chassis main body 100. The sub-slider 82 is disposed on the side of the rear surface of the traverse 2 in a direction perpendicular to the main slider 81.

The main slider 81 and the sub-slider 82 are respectively provided with cam mechanisms for displacing the traverse 2.

A base member (not shown) is provided between the main slider 81 and the traverse 2, and another base member (not shown) is provided between the sub-slider 82 and the traverse 2. Here, the base member is fixed to the base body 100, a position of a cam pin of the traverse 2 is limited by a vertical groove provided in the base member, and a position of a cam pin of the traverse 2 is limited by a vertical groove provided in the base member.

A loading motor 6 is disposed on one end of the main slider 81, the loading motor 6 and one end of the main slider 81 are connected to each other with a gear mechanism 7.

The main slider 81 can slide in a longitudinal direction by driving the loading motor 6. The main slider 81 is connected to the sub-slider 82 through a cam lever 83.

The base body 100 is provided with a disk discharging lever 4 and a disk inserting lever 5. A disk is inserted and discharged by these levers. That is, the loading motor 6 is driven, the driving force moves the vertically moving means 80 through the gear mechanism 7, and a known mechanism comprising a groove cam and a pin (not shown) provided in the vertically moving means 80 inserts and discharges a disk.

FIG. 2 shows the lid 200. The lid 200 is provided with a convex portion 12. The convex portion 12 projects from a position of the spindle motor 1 opposed to the rotation stage 1b toward the rotation stage 1b. The lid 200 is provided at its outer edge with a plurality of screw holes 15, and the lid 200 is mounted on the base body 100 through screws. The lid 200 is provided at its central portion (central portion of the convex portion 12) with an opening 201. The convex portion 12 is provided around the opening 201. The opening 201 is a circular opening having a radius greater than the center hole of a disk 14. Therefore, the convex portion 12 is greater than the hub 1a of the spindle motor 1 which is fitted into the center hole of the disk and smaller than the rotation stage 1b.

FIG. 4 shows a mounting operation state of a disk 14 on the spindle motor 1. After the disk is inserted, the traverse 2 is displaced in a direction in which the spindle motor 1 approaches the lid 200 around the rotation support shaft X on the front side. When the spindle motor 1 is moved in the direction in which the spindle motor 1 most approaches the lid 400, the disk 14 abuts against the lid 400 as shown in FIG. 4, and the disk 14 is pressed by the spindle motor 1 and the lid 400. The pawl or the ball (not shown) provided on the hub 1a of the spindle motor 1 is fitted into the center hole of the disk 14 by this pressing force, and the disk 14 is mounted on the hub 1a and the rotation stage 1b. If the mounting operation of the disk is completed, the traverse 2 moves in a direction in which the spindle motor 1 separates from the lid 200.

These motions are carried out if the loading motor 6 is driven and the vertically moving means 80 is moved.

As shown in FIGS. 4 and 5, in this embodiment, the lid 200 is provided with the convex portion 12 which projects toward the rotation stage 1b, a height of a portion 12a of the convex portion 12 closer to the opening and a height of a portion 12*b* of the convex portion 12 on the opposite side are different from each other and they are inclined through the angle A°. With this, when the traverse 2 most approaches the lid 200, an inclining surface formed by a disk receiving surface of the spindle motor 1 (i.e., an upper surface of the rotation stage 1*b*) with respect to the lid 200 is substantially in parallel to a tip end surface of the convex portion 12. That is, the tip end surface of the convex portion 12 (surface opposed to the traverse 2) is inclined with respect to the lid 200 through the angle A°, and this surface is formed by drawing. Since the tip end surface of the convex portion 12 is inclined, a gap is less prone to be generated between a disk 14 and the tip end surface of the convex portion 12. Thus, the disk 14 is uniformly pressed by the spindle motor 1 and the tip end surface of the convex portion 12. With this, the disk 14 is stably mounted on the hub 1*a* and the rotation stage 1*b*.

According to the disk apparatus of the present invention, it is possible to reliably mount a disk while reducing the disk apparatus in thickness. Especially according to the invention, the tip end of the convex portion is inclined with respect to the lid such that the tip end surface of the convex portion provided on the lid is substantially in parallel to the surface of the rotation stage when the traverse approaches the lid. Therefore, a disk on the spindle motor and the tip end surface of the convex portion become substantially in parallel to each other, a force is efficiently transmitted, and a disk can be mounted stably. Further, in the invention, a narrow portion of the lid is integrally formed on the lid and thus, the strength of the lid can be enhanced, and the chassis outer sheath can further be reduced in thickness.

INDUSTRIAL APPLICABILITY

According to the disk apparatus of the present invention, it is possible to reliably mount a disk while reducing the disk apparatus in thickness. Thus, the disk apparatus is especially effective as a disk apparatus which is incorporated or integrally provided in a main body of a thin so-called notebook computer in which display means, input means, processing means and the like are integrally provided.

The invention claimed is:

1. A disk apparatus comprising a chassis outer sheath having a base body and a lid, having a convex portion, that is in parallel with said base body, in which a front surface of said chassis outer sheath is formed with a disk inserting opening into which a disk is directly inserted, the base body is provided with a traverse, a spindle motor having a rotation stage on which the disk is placed is held by the traverse, one side of the traverse is inclined and moved around another side of the traverse as a rotation support shaft on the front side of the chassis outer sheath, thereby bringing the rotation stage close to the lid, the disk placed on the rotation stage is pushed toward the rotation stage to mount the disk on the rotation stage by the convex portion being smaller than the rotation stage and being provided around a circular opening greater than a hub of the spindle motor on the side of the center portion of the lid such that the convex portion projects toward the rotation stage at a position opposed to the rotation stage, wherein the convex portion located on the one end of the traverse is higher than the convex portion located on the other end of the traverse, whereby a tip end of the convex portion is inclined such that the tip end of the convex portion becomes substantially in parallel to a surface of the rotation stage when the traverse approaches the lid.

2. The disk apparatus according to claim 1, wherein the convex portion is integrally formed with the lid by drawing.

3. The disk apparatus according to claim 1, wherein the tip end of the convex portion on the side of the disk insertion opening is inclined toward the rotation stage.

4. The disk apparatus according to claim 1, wherein the one side of the traverse is moved by a main slider and a sub-slider, the main slider is disposed on the side of the spindle motor in such a direction that one end of the main slider comes on the side of a front surface of the chassis outer sheath and the other end comes on the side of a rear surface of the chassis outer sheath, the sub-slider is disposed on the side of the rear surface of the spindle motor in a direction perpendicular to the main slider.

* * * * *